United States Patent [19]
Takeuchi et al.

[11] 3,929,016
[45] Dec. 30, 1975

[54] FLOWMETER FOR AN OPEN AQUEDUCT

[75] Inventors: Kazuhiko Takeuchi, Fujisawa; Ryoichiro Matsumoto, Yokohama, both of Japan

[73] Assignee: Yamatake-Honeywell Company, Ltd., Tokyo, Japan

[22] Filed: Mar. 12, 1975

[21] Appl. No.: 557,793

[30] Foreign Application Priority Data
Mar. 14, 1974 Japan............................ 49-28500

[52] U.S. Cl. ........................................... 73/194 EM
[51] Int. Cl.² ........................................... G01F 1/58
[58] Field of Search............... 73/194 EM, 215, 216

[56] References Cited
UNITED STATES PATENTS
3,177,709  4/1965  Fischer ..................... 73/194 EM
3,479,873  11/1969 Hermanns.................... 73/194 EM
3,633,417  1/1972  Montague...................... 73/215 X FOREIGN PATENTS OR APPLICATIONS
1,279,529  11/1961  France......................... 73/194 EM

*Primary Examiner*—Charles A. Ruehl
*Attorney, Agent, or Firm*—Arthur H. Swanson; Lockwood D. Burton; Laurence J. Marhoefer

[57] ABSTRACT

A flowmeter for an open aqueduct comprises a dam gate positioned across the open aqueduct, the dam gate being arranged to be raised or lowered. An electromagnetic flowmeter transducer is mounted through the lower central portion of the dam gate. The relation of the transducer with respect to the dam gate is such that when the gate is lowered to the operational position the inner diameter of the transducer is completely submerged in the fluid, the flow rate of which is to be measured.

1 Claim, 4 Drawing Figures

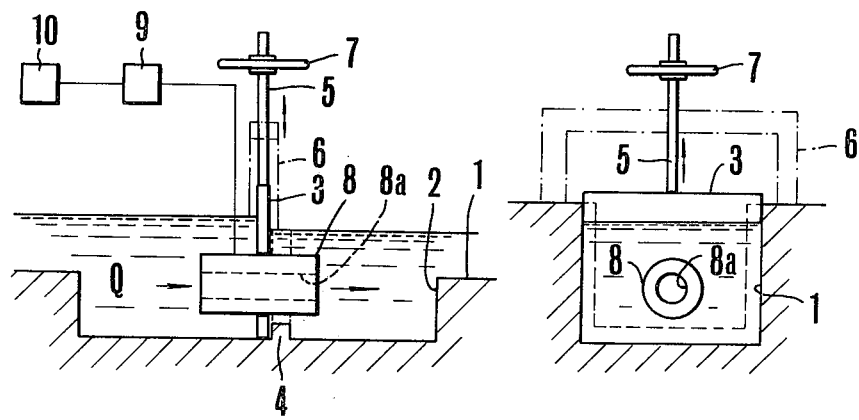
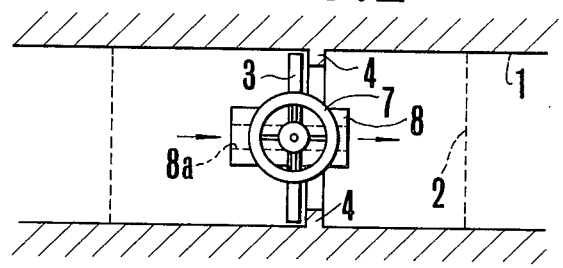
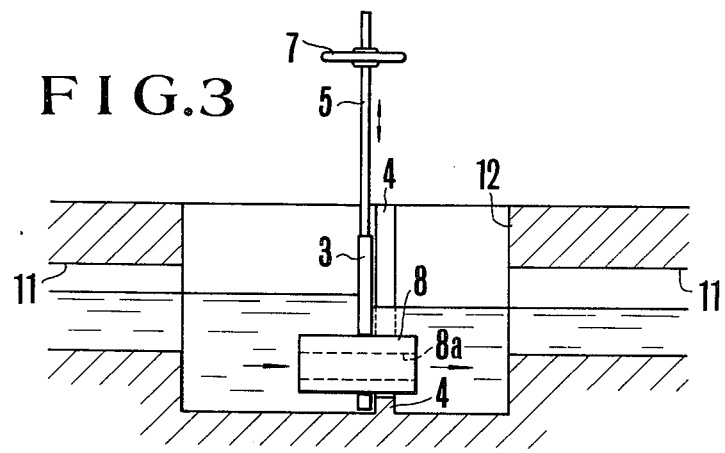

FLOWMETER FOR AN OPEN AQUEDUCT

BACKGROUND OF THE INVENTION

1. Field of the Invention

The present invention relates to flowmeters. More particularly, it relates to a flowmeter for an open aqueduct and features an electromagnetic type flowmeter.

2. Description of the Prior Art

Conventionally, a dam or weir type of flowmeter has been used to measure the flow rate in an open aqueduct, the dam or weir being provided with a predetermined notch. A liquid level meter is used to measure the height of the liquid level above the notch in the weir as a function of flow rate. While, for many purposes, the conventional weir type flow measurement is satisfactory, there are, however, several features of such a weir type flow measurement which are considered defects, namely:

1. The difference in fluid level between the upstream and downstream portions of the fluid flow must be relatively large, necessitating a relatively large loss of head.

2. Solid matter floating in the fluid or solid precipitants cause measurement errors.

3. The resultant measurement is nonlinear with respect to flow rate and requires complex adjustment to produce a meaningful linear relationship.

4. Because of limitations on the range of fluid head, it is difficult to maintain stability and accuracy over a long time period.

On the other hand, an electromagnetic flowmeter has been proposed for the measurement of flow following Faraday's electromagnetic law. Such electromagnetic flowmeters have the advantage that a negligible head drop is entailed, that disturbances in the flow has little effect on the flow measurement and a quick accurate determination of flow may be obtained. One disadvantage of the electromagnetic flow transducer is that the tube constituting the central bore of the transducer must be continually filled with the fluid to be measured. If the tube is only partly filled with the fluid, the electromagnetic flowmeter does not function properly. Because of that requirement, electromagnetic flowmeters have not been found satisfactory for use with an open aqueduct or in a culvert.

SUMMARY OF THE INVENTION

It is, accordingly, an object of the present invention to provide an improved flowmeter arrangement for measuring the flow rate of fluid flowing in an open aqueduct.

It is another object of the present invention to provide an improved flowmeter arrangement as set forth which obviates the shortcomings of the prior devices and combines the advantages of both the weir or dam type flowmeter and the electromagnetic type flowmeter.

In accomplishing these and other objects, there has been provided, in accordance with the present invention, a fluid flow measuring apparatus wherein a dam gate is arranged to be positioned across an open aqueduct, the lower central portion of the gate carries an electromagnetic flowmeter transducer extending therethrough. The open aqueduct is, itself, provided with a sump or well into which the dam gate may be extended. The depth of the sump is such that when the gate is lowered to an operating position, the electromagnetic transducer is completely submerged in the fluid.

BRIEF DESCRIPTION OF THE DRAWINGS

A better understanding of the present invention may be had from the following detailed description when read in the light of the accompanying drawings in which:

FIGS. 1 (a) and 1(b) are side and end elevational views, respectively, of an embodiment of the invention;

FIG. 2 is a top view of the structure shown in FIG. 1; and

FIG. 3 is a side elevational view of structure embodying the invention as applied to a culvert.

DETAILED DESCRIPTION

Referring now to the drawings in more detail, there is shown in FIGS. 1 and 2 an open aqueduct 1 having a step portion 2 defining a sump having a fluid depth greater than the fluid depth of the aqueduct. A dam gate 3 is positioned to be raised or lowered into the sump portion of the aqueduct. A ridge or shoulder 4 projects inwardly from the side and bottom walls of the aqueduct 1 near the longitudinal center of the preformed sump 2. The shoulder 4 provides a stop and guide for the movable dam gate 3. To the dam gate 3, there is secured a threaded shaft 5 which cooperates, in a known manner, with a gate frame 6 to raise and lower the gate as the shaft 5 is rotated. A hand wheel 7 is secured to the shaft 5 to facilitate the rotation of the shaft 5. While the dam gate 3 has been referred to as a movable gate, it will be appreciated that a fixed gate is equally effective in embodying the present invention.

In the lower central portion of the dam gate 3, there is mounted an electromagnetic flow transducer tube 8 having a central tubular opening or bore 8a through which the fluid of the aqueduct flows. The transducer 8 is so located with respect to the gate 3 that, as the gate 3 is lowered to the operating position, the fluid flowing in the aqueduct is blocked by the gate 3 with the exception of the flow through the bore 8a. Further, the position of the transducer 8 is such that, in the lowered position, the bore 8a is completely filled with the flowing fluid. The sump 2 allows the transducer 8 to be lowered to a position below the minimum level of the fluid in the aqueduct 1, thus assuring that the central bore 8a will be filled with the flowing fluid.

The electromagnetic flowmeter is connected to a signal conditioner 9 where the output signal from the transducer is converted to a meaningful form. The output of the signal conditioner 9 is connected to a signal utilization device 10 which may include a suitable indicator for indicating the flow rate.

When the dam gate 3, carrying the electromagnetic flow transducer, is lowered to the operating position, the flow of the fluid is effectively blocked by the gate 3. The sump 2 is defined by a step portion both before and after the dam gate 3. The depth of the sump 2, or the height of the step portion is such that so long as there is fluid flowing in the aqueduct, the sump will be full, therefore, the electromagnetic transducer 8 carried by the gate will always be submerged to a depth whereat the bore 8a of the transducer will be completely filled.

With the transducer 8 thus submerged in the sump 2, all of the fluid flowing in the aqueduct flows through the transducer 8 where the flow rate is sensed, and a corresponding signal transmitted to the supporting electronic circuitry. This takes advantage of the good features of the electromagnetic transducer regarding low head loss, highly accurate signal and independence from adverse effects of solid matter in or precipitated from the stream. It also takes advantage of the good features of the dam type flowmeter in its simplicity and repeatability.

In FIG. 3 there is shown a means for embodying the present invention in a closed conduit or culvert. Here, whereas the main fluid channel is a closed conduit or culvert 11, an open sump 12 is provided therein. At the position of the sump 12, the fluid channel is substantially an open aqueduct. A dam gate 3 is again provided, working against a guide rib 4. The gate 3 may be raised or lowered by the cooperative action of the screw shaft 5 and the operating hand wheel 7. As before, the gate 3 carries an electromagnetic flow transducer 8 having a central bore 8a therethrough. The sump 12 is of such depth that as the gate 3 is lowered to the operating position all of the flow of the fluid is through the transducer 8, and the bore 8a of the transducer 8 is filled with the flowing fluid.

What is claimed is:
1. A flowmeter for an open aqueduct comprising
  a sump in said aqueduct of a predetermined depth greater than the depth of said aqueduct;
  a dam gate positioned across said aqueduct intermediate the ends of said sump; and
  an electromagnetic fluid flow transducer having a central bore therethrough,
  said electromagnetic fluid flow transducer being carried by said gate and positioned thereby to be completely submerged in the fluid in said sump, with the fluid flowing through the submerged bore of the transducer.

* * * * *

UNITED STATES PATENT OFFICE
CERTIFICATE OF CORRECTION

Patent No. 3,929,016          Dated December 30, 1975

Inventor(s) Kazuhiko Takeuchi and Ryoichiro Matsumoto

It is certified that error appears in the above-identified patent and that said Letters Patent are hereby corrected as shown below:

Claim 1, lines 2 and 3, before "depth" the word ---fluid--- should be inserted;

Claim 1, line 9, the word "be" should be deleted; and

Claim 1, line 10, the word "submerged" should be ---submerge said bore---.

Signed and Sealed this

Twenty-first Day of December 1976

[SEAL]

Attest:

RUTH C. MASON
*Attesting Officer*

C. MARSHALL DANN
*Commissioner of Patents and Trademarks*